US011261916B2

(12) United States Patent
Massini et al.

(10) Patent No.: US 11,261,916 B2
(45) Date of Patent: Mar. 1, 2022

(54) MAGNETIC BEARING ASSEMBLY HAVING INNER VENTILATION

(71) Applicant: Nuovo Pignone Srl, Florence (IT)

(72) Inventors: Andrea Massini, Florence (IT); Luca Lombardi, Florence (IT); Manuele Bigi, Florence (IT); Giuseppe Sassanelli, Florence (IT); Luciano Mei, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 311 days.

(21) Appl. No.: 14/893,721

(22) PCT Filed: May 28, 2014

(86) PCT No.: PCT/EP2014/061047
§ 371 (c)(1),
(2) Date: Nov. 24, 2015

(87) PCT Pub. No.: WO2014/191454
PCT Pub. Date: Dec. 4, 2014

(65) Prior Publication Data
US 2016/0108967 A1   Apr. 21, 2016

(30) Foreign Application Priority Data
May 29, 2013   (EP) ..................................... 13169719

(51) Int. Cl.
*F16C 37/00*   (2006.01)
*F16C 32/04*   (2006.01)

(52) U.S. Cl.
CPC ........ *F16C 37/005* (2013.01); *F16C 32/0459* (2013.01); *F16C 32/0476* (2013.01)

(58) Field of Classification Search
CPC . F16C 37/005; F16C 32/0459; F16C 32/0476
(Continued)

(56) References Cited

U.S. PATENT DOCUMENTS

| 6,057,619 A | 5/2000 | Domberg et al. |
| 2004/0112800 A1* | 6/2004 | Ogino .................... F16C 39/02 209/199 |

(Continued)

FOREIGN PATENT DOCUMENTS

| CN | 103061869 A | 4/2013 |
| EP | 0317946 A2 | 5/1989 |

(Continued)

OTHER PUBLICATIONS

International Search Report and Written Opinion issued in connection with corresponding PCT application No. PCT/EP2014/061047 dated Jun. 25, 2014.

(Continued)

*Primary Examiner* — Jianchun Qin
(74) *Attorney, Agent, or Firm* — Baker Hughes Patent Org.

(57) ABSTRACT

A magnetic bearing assembly for a rotary machine having a rotor shaft, comprising a stator magnetic circuit secured to a stationary support element and comprising at least one body of ferromagnetic material and at least one coil, both being fitted in a protective annular housing leaving uncovered a surface of revolution of said ferromagnetic body and a surface of revolution of said one coil, the magnetic bearing assembly comprising an annular thrust collar secured to the rotor shaft and radially extending towards the stator magnetic circuit by a radial portion, said radial portion facing the uncovered surfaces of said ferromagnetic body and said one coil. The annular thrust collar comprises at least one flow channel.

5 Claims, 3 Drawing Sheets

(58) Field of Classification Search
USPC .......................................................... 310/90.5
See application file for complete search history.

(56) References Cited

U.S. PATENT DOCUMENTS

2007/0063604 A1* 3/2007 Shimada ............. F16C 32/0461
310/90.5
2009/0265038 A1 10/2009 Ramsey
2010/0187926 A1* 7/2010 Baudelocque ........ F16C 32/047
310/88

FOREIGN PATENT DOCUMENTS

| EP | 1223357 A1 | 7/2002 |
| EP | 1522749 A1 | 4/2005 |
| JP | H0571533 A | 3/1993 |
| SU | 1275145 A1 | 12/1986 |

OTHER PUBLICATIONS

First Office Action and Search issued in connection with corresponding RU Application No. 2015149338 dated Mar. 1, 2018.
First Office Action and Search issued in connection with corresponding CN Application No. 201480030979.5 dated Apr. 18, 2017.

* cited by examiner

MAGNETIC BEARING ASSEMBLY HAVING INNER VENTILATION

BACKGROUND

Embodiments of the invention relate to bearings, in particular magnetic bearings used in rotary machines having a rotor.

In particular, embodiments of the present invention relate to axial thrust active magnetic bearings having electromagnetic elements arranged in the radial direction and adapted to cooperate with a thrust collar secured to the rotor.

Axial magnetic bearings use electromagnetic forces pulling in opposition on the thrust collar to maintain relative position of a rotating assembly (rotor) to a stationary component (stator). A thrust collar is generally a flat, solid, ferromagnetic disc secured to the rotor. Disc-shaped electromagnetic elements are located on either side of the thrust collar and bolted to the rotary machine housing, forming the active axial magnetic bearing.

Use of magnetic bearings in rotary machines is becoming more and more widespread, in particular in case of corrosive or hot fluid. The inner ventilation of the magnetic bearing is thus important to increase the service-life of the bearing.

The friction generated by the relative movement of the thrust collar with respect to the electromagnetic elements creates a radial flow of fluid which leads to the cooling of the magnetic bearing.

However, such flow is dependant of the friction between two components and the rotational speed of the rotor, and is thus not reliable. Furthermore, because of uncertainty in the pressure distribution, a back flow could appear which would lead to a lack of radial flow of fluid.

Current axial magnetic bearings do not provide enough inner ventilation, so that the flow of fluid becomes insufficient to cool the axial magnetic bearing.

SUMMARY OF THE INVENTION

An object of embodiments of the present invention is to remedy the above drawbacks.

Another object of embodiments of the present invention is to provide an axial magnetic bearing assembly having enhanced cooling flow, while being easy to manufacture.

It is another object of embodiments of the present invention to ensure recirculation of the flow of cooling fluid even in case of poor differential pressure inside the bearing.

In an embodiment, a magnetic bearing assembly for a rotary machine having a rotor shaft, comprises a stator magnetic circuit secured to a stationary support element and comprising at least one body of ferromagnetic material and at least one coil, both being fitted in a protective annular housing leaving uncovered a surface of revolution of the ferromagnetic body and a surface of revolution of the one coil, the magnetic bearing assembly comprising an annular thrust collar secured to the rotor shaft and radially extending towards the stator magnetic circuit by a radial portion, the radial portion facing the uncovered surfaces of the ferromagnetic body and the one coil.

The annular thrust collar comprises at least one flow channel.

Such flow channels facilitate the pumping of the flow of cooling fluid enhancing the cooling of the magnetic bearing.

In an embodiment, the one flow channel extends from the outer cylindrical surface of the radial portion towards the rotor shaft.

In an embodiment, the one flow channel is a groove provided on at least one of the lateral surfaces of the radial portion of the annular thrust collar.

In another embodiment, the one flow channel is a groove provided inside the radial portion of the annular thrust collar.

For example, the groove is oblique and/or radial and can open on the outer cylindrical surface of the rotor shaft.

In an embodiment, the groove can be radially and tangentially shaped.

In an embodiment, the bearing assembly comprises a plurality of flow channels.

In an embodiment, the stator magnetic circuit comprises two bodies of ferromagnetic material, each facing one lateral surface of the radial portion of the annular thrust collar.

The bearing is, for example, an axial magnetic bearing.

According to another aspect of the invention, a turbo machine comprises a stator, a rotor mounted in rotation in the stator, and at least one magnetic bearing assembly as described above radially arranged between the rotor and the stator.

BRIEF DESCRIPTION OF THE DRAWINGS

Embodiments of the present invention will be better understood from studying the detailed description of a number of embodiments considered by way of entirely non-limiting examples and illustrated by the attached drawings in which.

DETAILED DESCRIPTION

The following detailed description of the exemplary embodiments refers to the accompanying drawings. The same reference numbers in different drawings identify the same or similar elements. Additionally, the drawings are not necessarily drawn to scale.

Figure 1:
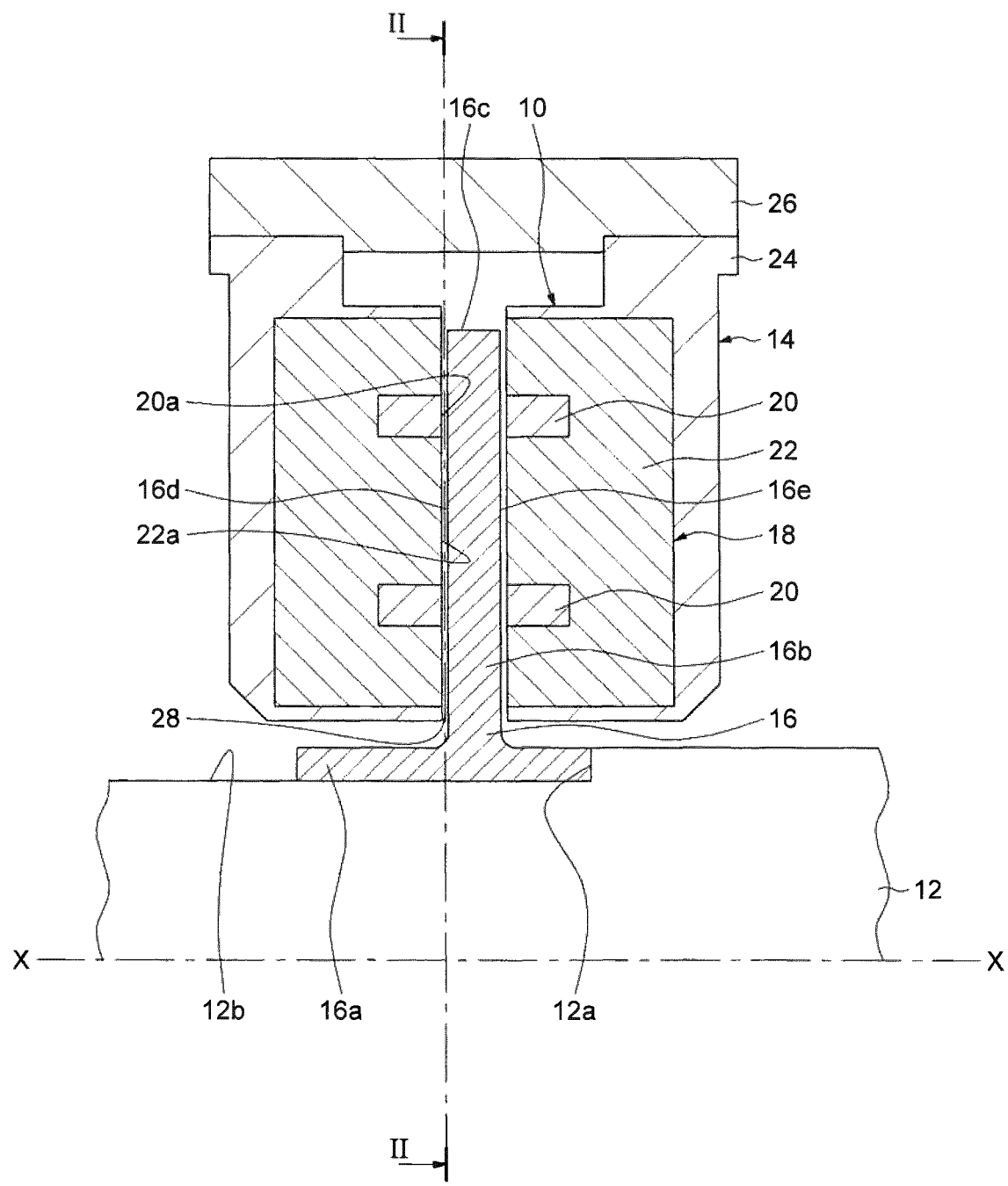
FIG. 1 is an axial half-section of the axial magnetic bearing assembly according to an embodiment of the invention mounted between two components of a motor.

As illustrated on FIG. 1, a magnetic bearing, designed by general reference number 10, is designed to be mounted in a rotary machine (not shown) comprising a casing or housing, a rotating shaft 12 extending along an axis X-X and adapted to support a rotor part (not shown). For example, if the rotating machine is a centrifugal compressor, the rotor part comprises impellers. The rotating shaft 12 and the associated rotor part form a rotor assembly.

As illustrated on FIG. 1, the magnetic bearing 10 is of the axial type and is designed to support the rotor shaft 12 inside the stator casing. A radial type magnetic bearing (not shown) may also be associated to the axial magnetic bearing 10 to support the rotating shaft 12.

The active magnetic bearing 10 comprises a stator armature 14 fixed to the stator casing and a rotor armature 16 or annular thrust collar having the shape of a disk secured to the rotating shaft 12. The annular thrust collar 16 extends radially from an axial plate 16a secured to the rotor shaft 12 towards the stator magnetic circuit 18 by a radial portion 16b having an outer cylindrical surface 16c and two lateral surfaces 16d, 16e.

The stator armature 14 comprises a stator magnetic circuit 18 including, in conventional manner, one or more annular coils 20 and two ferromagnetic bodes 22 which may be massive or laminated locally. In the example of FIG. 1, each ferromagnetic body 22 encloses two annular coils 20. The stator armature 14 also comprises a protective annular support or annular housing 24 into which is placed the stator magnetic circuit 18, leaving uncovered a surface of revolution 22a of the ferromagnetic bodes 22 and a surface 20a of revolution of each coils 20. The support 24 is secured to a stationary support element 26 that is itself fixed to the casing.

As illustrated, the radial portion 16b of the thrust collar 16 faces the uncovered surfaces 20a, 22a respectively of each ferromagnetic bodies 22 and each coils 20. In other words, the stator magnetic circuit 18 is placed axially facing the annular thrust collar 16 with no mechanical contact, leaving an axial gap 28 between the annular thrust collar 16 and the stator magnetic circuit 18.

The rotation shaft 12 may be provided with a stepped profile 12a for an axial positioning of the thrust collar 16. The annular thrust collar 16 could, for example, be made integrally with the rotor shaft 12.

Figure 2:
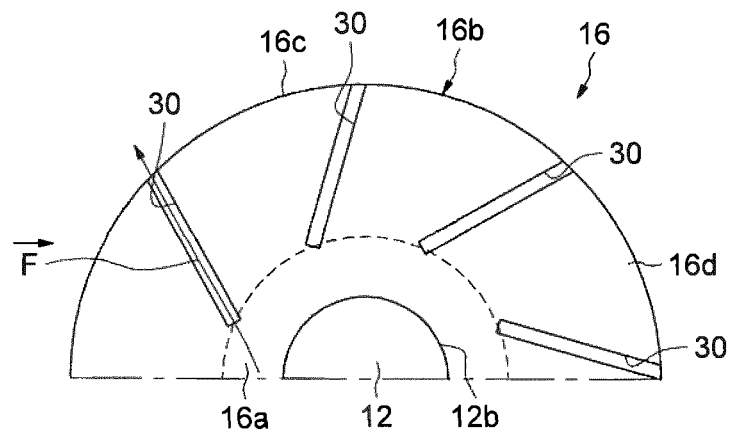
FIG. 2 is an axial half-section of a thrust collar along line II-II of FIG. 1 according to an embodiment of the invention.
Figure 3:
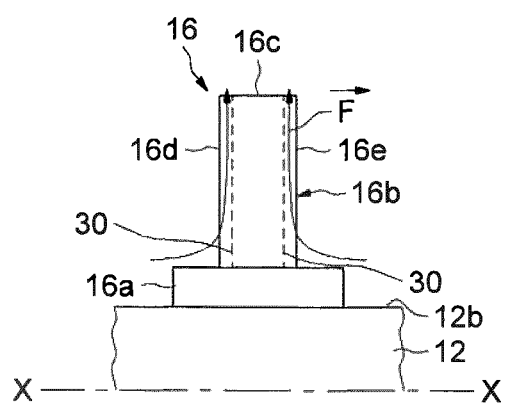
FIG. 3 is an half view of the thrust collar of FIG. 1 mounted on a rotor according to an embodiment of the invention.

As illustrated on FIGS. 2 and 3, the annular thrust collar 16 comprises a plurality of grooves 30 on each radial lateral surface 16d, 16e of the radial portion 16b. The grooves 30 act as flow channels for the flow of the fluid. The flow channels 30 extend from the outer cylindrical surface 16c of the radial portion 16b towards the rotor shaft 12 and are inclined grooves directed radially towards the shaft 12 and are provided on the lateral surface 16d of the radial portion 16b of the thrust collar 16. As illustrated, the grooves 30 are shaped radially and tangentially to the outer cylindrical surface 16c of the radial portion 16b.

As illustrated on FIG. 3, the flow channels 30 are be provided on both lateral surfaces 16d, 16e of the radial portion 16b of the thrust collar 16. Alternatively, flow channels can be provided only on one lateral surface of the thrust collar 16.

As illustrated, the flow channels 30 opens on the axial plate 16a of the thrust collar 16. Alternatively, the flow channels can open on the outer cylindrical surface 12b of the rotor shaft 12. The fluid inside the turbomachine flows through the air gap 28 and inside the flow channels 30. The direction of flow is shown by the arrow F.

Such flow channels 30 increase the ventilation inside the magnetic bearing and allow the magnetic bearing to be cooled.

Figure 4:
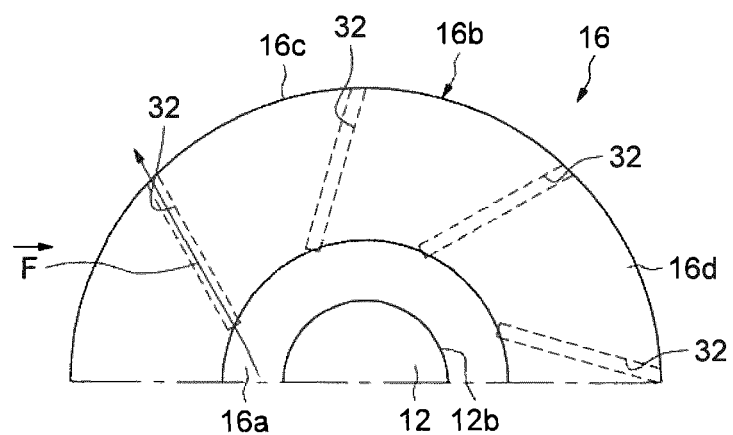
FIG. 4 is an axial half-section of a thrust collar according to an embodiment of the invention.
Figure 5:
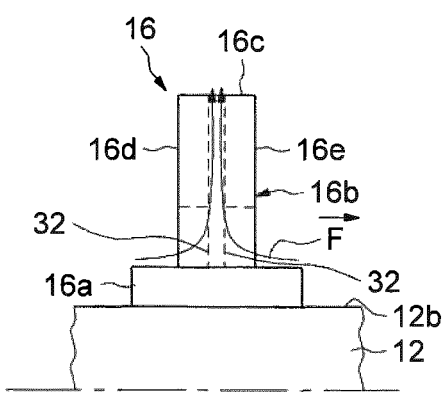
FIG. 5 is an half view of the thrust collar of FIG. 4 mounted on a rotor according to an embodiment of the invention.

The embodiment shown in FIGS. 4 and 5, in which identical parts bear the same reference, is substantially different from the embodiment of FIGS. 2 and 3 in the location of the flow channels.

As illustrated on FIGS. 4 and 5, the thrust collar 16 is provided with a plurality of grooves 32 provided inside the radial portion 16b. The grooves 32 act as flow channels for the fluid and open only at the outer cylindrical surface 16c of the radial portion 16b. Alternatively, the flow channels can open on the outer cylindrical surface 12b of the rotor shaft 12.

The groove 32 are inclined and radially directed towards the shaft 12. As illustrated, the grooves 32 are shaped radially and tangentially to the outer cylindrical surface 16c of the radial portion 16b.

A benefit of an embodiment of the present invention, is the axial magnetic bearing assembly has enhanced cooling flow. T flow channels facilitate the pumping of the flow of fluid enhancing the cooling of the active magnetic bearing. The magnetic bearing is thus provided with inner ventilation.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A magnetic bearing assembly for a rotary machine having a rotor shaft, the bearing assembly comprising:
    a stator magnetic circuit secured to a stationary support element and comprising at least one body of ferromagnetic material and at least one coil, both the at least one body of ferromagnetic material and the at least one coil being fitted in a separate protective annular housing having a slot therein configured to receive the at least one body of ferromagnetic material, and leaving uncovered only a surface of revolution of said ferromagnetic body and a surface of revolution of said one coil, wherein the annular housing is arranged between the ferromagnetic body and the stationary support element in a radial direction, and
    an annular thrust collar secured to the rotor shaft and radially extending towards the stator magnetic circuit by a radial portion, said radial portion facing the uncovered surfaces of said ferromagnetic body and said one coil, wherein the annular thrust collar comprises at least one flow channel extending from an outer cylindrical surface of the radial portion towards the rotor shaft, wherein the annular housing is arranged between the ferromagnetic body and the annular thrust collar in the radial direction,
    wherein said at least one flow channel is a plurality of angled radial grooves each provided on at least one lateral surface of the radial portion of the annular thrust collar and opening on an outer cylindrical surface of the rotor shaft.

2. The bearing assembly according to claim 1, wherein each of the plurality of radial grooves is radially and tangentially shaped.

3. The bearing assembly according to claim 1, wherein the stator magnetic circuit comprises two bodies of ferromagnetic material, each facing one lateral surface of the radial portion of said annular thrust collar.

4. The bearing assembly according to claim 1, wherein the magnetic bearing assembly is an axial magnetic bearing.

5. A turbomachine comprising:
    a stator,
    a rotor mounted in rotation in said stator, and
    at least one magnetic bearing assembly according to claim 1.

* * * * *